O. A. KENYON.
ELECTRIC WELDING.
APPLICATION FILED JUNE 28, 1916.
1,218,266.
Patented Mar. 6, 1917.
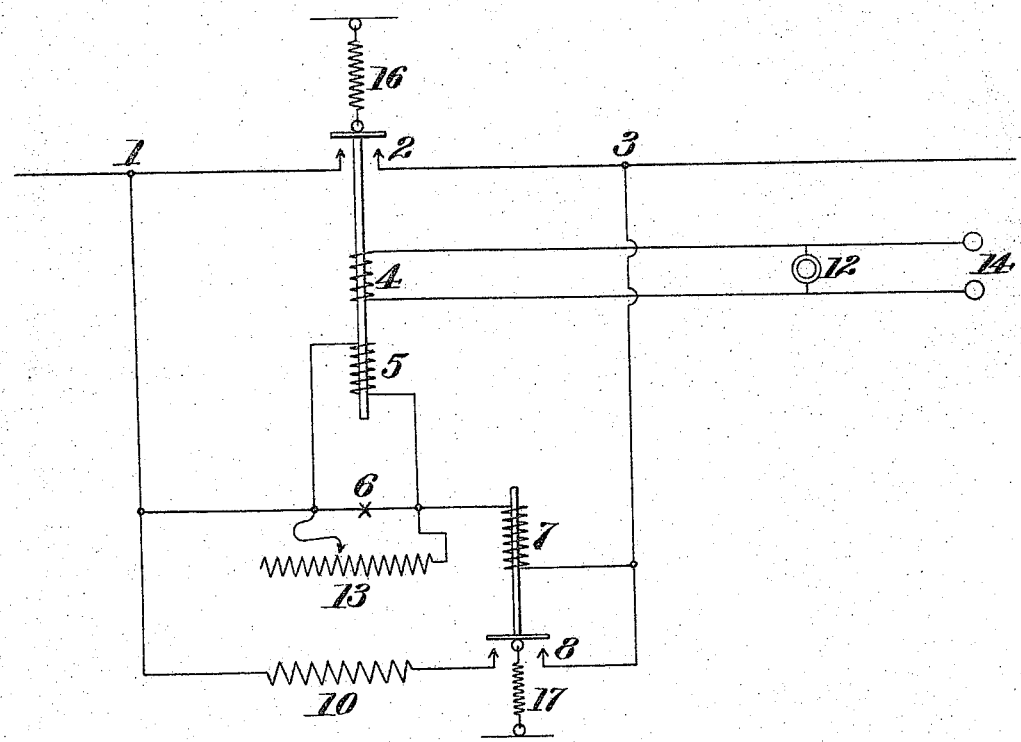
Inventor
Otis Allen Kenyon
By T. Walter Fowler
Attorney

UNITED STATES PATENT OFFICE.

OTIS ALLEN KENYON, OF NEW YORK, N. Y.

ELECTRIC WELDING.

1,218,266.  Specification of Letters Patent.  Patented Mar. 6, 1917.

Application filed June 28, 1916. Serial No. 106,423.

*To all whom it may concern:*

Be it known that I, OTIS ALLEN KENYON, a citizen of the United States, residing at New York city, in the county of New York and State of New York, have invented certain new and useful Improvements in Electric Welding, of which the following is a specification.

My invention relates to the art of electric-welding, and it consists of the parts and the arrangements and combinations of parts substantially as I will hereinafter describe and claim.

A leading object of the present invention is to adjust and control the heating effect of the arc by a combination of a voltage limitation and the power limitation, and in the accompanying drawing forming part of this specification the figure shows more or less diagrammatically a circuit for a system capable of carrying out the present invention.

In order that the present invention may be fully understood, and the value of the same appreciated, I will state that although electric arc welding is one of the oldest practical applications of electricity, it has apparently not come into the general use it might have, had it been better understood, and the welding current better controlled.

Heretofore, two general systems of electric distribution have been employed in electric arc welding, namely, the constant-potential system and the constant-current system. The first named system, namely, the constant potential system, is the oldest and is universally used where more than one welder operates from the same machine. The constant-current system may properly be subdivided into two types, namely, the open circuit and the closed circuit. The open-circuit system which is well known in the art is limited to use with one arc on each machine; it has other draw-backs, which I will hereinafter mention. The closed circuit constant-current system was, apparently, first disclosed in my prior Patent No. 1,181,227, dated May 2, 1916, which system has opened great possibilities in the way of heat control which exist in no other system of which I have knowledge.

That the advantages to be derived from the proper control of the heat effects in the welding arc may be better understood, it is desirable at this time to consider the factors which enter into said control. It is known that the rate of total heat production in the arc is equal to the power in watts consumed between the terminals of the arc, but the temperature of the metal is not simply nor directly related to the watts consumed. In order to control the temperature of the metal, it is necessary then to take into account all of the factors that determine it. Therefore, it may be well to analyze briefly, the production of heat in an electric arc welding.

Beginning with the pencil point which ordinarily, but not necessarily, is connected to the negative side of the circuit, we find that the temperature produced here depends upon the power in watts consumed at this point; that is, upon the product of the current through the arc and the E. M. F. drop at the terminal of the arc. Experience has shown that the E. M. F. drop at each terminal of the arc is practically constant, and independent of the current; that is, the resistance at each terminal of the arc decreases when the current increases, and vice versa, which accounts for the instability of a metallic arc when connected to a source of constant-potential, and this is the reason why it must be connected in series with a relatively large resistance. Therefore, since the E. M. F. is constant, the temperature of the metal at the pencil point, in other words, the flow of the metal from the pencil point depends almost entirely upon the current alone.

Again, the temperature of the metal in the arc stream is determined by the power consumed in the stream, and by the rate of flow from the pencil.

The resistance of the arc stream seems to be approximately constant per unit of length, so that the E. M. F. consumed is directly proportional to the length of the arc. This is the reason that a carbon arc with a long stream can be operated from a constant-potential source without a series resistance. The resistance of the arc stream takes the place of an external resistance and stabilizes the arc sufficiently to prevent its being extinguished. The power consumed in the arc is the product of the current through the arc and the voltage drop in the stream; while the flow of metal is determined by the current, as above indicated.

Since the resistance of the stream is directly proportional to its length, the length of the arc is fixed by the voltage impressed across it. Therefore, in order to control the temperature of the metal in the stream, we must control both the current and the E. M. F. and each independently of the other.

The temperature at the end of the arc where it impinges upon the work depends upon the rate of flow of the metal, the temperature of the metal that arrives, and upon the rate at which energy is produced in the terminal itself, as well as upon the heat dissipating capacity of the mass surrounding the point where the metal is deposited. I have heretofore considered the origin of the heat brought in by the molten metal itself, and I will here state that the heat produced at this terminal of the arc is exactly similar to that produced at the other terminal; that is, it depends upon the current through the arc. Therefore, it will be seen that the final temperature of the metal depends upon both the current and the E. M. F.; and that the value of each must be controlled independently, if anything like accurate results are to be obtained while still retaining the flexibility of application.

With this general statement of the prior art and the requirements thereof, I will now state that in the present invention I propose to adjust and control the heating effect of the arc by a combination of a voltage limitation and a power limitation, the limitation of power being accomplished by connecting directly across the terminal of the arc a resistor having an adjustable resistance.

In my prior Patent, No. 1,181,227, before alluded to, I show a resistance across the terminals of each controller to enable me to operate a number of arcs in series and yet be able to vary the current in the individual arcs by shunting a portion of it around the controller.

In the present invention I connect the resistance not across the controller but across the arc itself; and the purpose of the resistance is in the present case, not to shunt a definite amount of current around the arc, but to prevent the power in the arc from exceeding a definite predetermined value.

With a shunt around the arc when the pencil is drawn back lengthening the arc and increasing the voltage, more current will pass through the shunt than normally and when the arc is shortened with a decrease in voltage more current will pass through the arc. Therefore, in general, the effect of resistance in parallel with the arc is to prevent the power consumption from varying directly with the changes in the length of the arc.

For any given resistance and main line current the voltage across the arc corresponds to a definite value of current and power in the arc, and it may be so chosen that the power is the same or even less at the upper voltage limit than it is at the normal voltage.

Having reference now to the drawing for a more complete understanding of my invention, I show a power regulation shunt used in connection with an arc voltage controller.

In said drawing 1 and 3 represent terminals of a circuit; 2 is a contactor; 4, 5 and 7 are solenoid coils; 6 represents the electric arc; 8 is a contactor; 10 is a resistor in series with the contactor, 8; 12 is a push button or equivalent switch; 13 is an adjustable shunt power regulator; 14 represents a separate source of electric energy; 16 and 17 are springs connected respectively to the contactors, 2 and 8.

The terminals 1 and 3 are connected in a circuit which carries a constant current or a regulated current; by a regulated current, I mean a current that is automatically regulated in such a way that a short circuit will not cause destructive rise in current. Normally, the terminals of the circuit are closed through a suitable short circuiting contact, 2, which is held closed by being connected to the core of an appropriate solenoid coil, 4, which itself is connected to a separate source of electric energy, 14, which is designed to be short circuited through the medium of an appropriate push button, switch, or like device, 12.

Connected to the terminals, 1 and 3, I have the resistance, 10, in series with a contactor, 8, and the arc circuits, 6 and 7, in parallel therewith. The contactor, 8, which may be of any approved construction, is also normally closed, but no current passes that way, on account of the fact that the closure at the contact, 2, reduces the voltage drop between the terminals, 1 and 3, to practically nothing. In the operation of the above parts, the pressing of the button, 12, or the manipulation of an appropriate switch, short circuits the coil, 4, and releases the contact, 2, under the pull of an appropriate spring, 16, connected thereto. In this condition of the parts, the current in the main circuit will pass from the terminal, 1, through the resistor, 10, contactor, 8, and back to the terminal, 3, the current through the resistor, 10, producing a drop in E. M. F. between the terminals, 1 and 3, before mentioned. Now, if the terminals of the arc, 6, are brought together, the resistance through that circuit will be so much less than through the resistor, 10, and the contactor, 8, that a large proportion of the current will immediately pass through the arc, 6, and the solenoid coil, 7, and in doing so, the coil is energized and its core serves to open the contactor, 8, leaving the arc, 6, and an appropriate shunt, 13, as the only paths through which the main circuit is maintained, and therefore, carrying all the current.

As the arc is lengthened or shortened in operation, more or less current is shunted through the solenoid, 5, and the shunt power regulator, 13. With this arrangement a rise in voltage across the arc is accompanied by an increase in current through the shunt, 13, which means a decrease in current through the arc, the result being, a change in power that is less than would be experienced with the shunt now used.

The coils, 4 and 5, are so related that each assists the other in pulling against the spring, 16, to which is connected the contactor, 2, and whenever the E. M. F. across the arc, 6, rises sufficiently, it will force enough current through the solenoid coil, 5, so that the combined pull of this coil and the solenoid coil, 4, will overcome the tension of the spring, 16, and short circuit the arc, by closing the contactor, 2, and thereby preventing any further rise in E. M. F., and killing the arc and the shunt without any possibility of temperature increase, which will burn the metal. The solenoid 4 operates to hold the contactor, 2, in its closed position, thus killing the arc, 6, and the solenoid coil, 7, and when this is accomplished, the contactor, 8, is again closed, under the action of its spring, 17, thereby leaving the control circuit in exactly the same condition as when the operation started, that is, ready to begin welding.

It will be readily observed that the circuits shown in the drawing are connections of a controller which may be used in a closed circuit-series system, such as described in my prior patent before alluded to. The shunt shown in the said patent was of no particular use except where more than one arc was used on the circuit. However, the present shunt is just as useful where one arc alone is used as where a series of arcs are employed. It also may be used on any system to control the regulation characteristic of the arc.

From the foregoing description it will be apparent that I adjust and control the heating effect of the arc by a novel combination of a voltage limitation and the power limitation and that I accomplish the limitation in power by connecting directly across the terminal of the arc a resistor having an adjustable resistance.

Having thus described my invention what I claim as new and desire to secure by Letters Patent is:

1. In electric welding, a regulated current welding arc, and means connected across said arc for varying the current in the arc in a predetermined ratio with the voltage across said arc.

2. In electric welding, a regulated current welding arc, and means for shunting current around the arc in direct ratio to the voltage across it.

3. In electric welding, a regulated current welding arc, and electro-responsive means controlled by the voltage across the arc for varying the current in the arc.

4. In electric welding, a regulated current welding arc, and adjustable means controlled by the voltage across the arc for varying the current in the arc.

5. In electric welding, a regulated current welding arc, and a resistance connected in parallel around the arc and adapted to shunt current around the arc in direct ratio to the voltage across the arc.

6. In electric welding, a regulated current welding arc, and adjustable resistance connected in parallel around the arc and adapted to shunt current around the arc in direct ratio to the voltage across the arc.

In testimony whereof I affix my signature.

OTIS ALLEN KENYON.